(12) United States Patent
Cudak et al.

(10) Patent No.: US 7,231,206 B2
(45) Date of Patent: Jun. 12, 2007

(54) GROUP APPLICATION FOR GROUP FORMATION AND MANAGEMENT

(75) Inventors: Mark Cudak, McHenry, IL (US); Ronnie Bernard Francis Taib, Marseilles (FR)

(73) Assignee: Motorola, Inc., Schaumburg, IL (US)

( * ) Notice: Subject to any disclaimer, the term of this patent is extended or adjusted under 35 U.S.C. 154(b) by 701 days.

(21) Appl. No.: 10/179,107

(22) Filed: Jun. 25, 2002

(65) Prior Publication Data
US 2003/0008674 A1 Jan. 9, 2003

(30) Foreign Application Priority Data
Jun. 29, 2001 (EP) ................... 01401740

(51) Int. Cl.
*H04M 3/42* (2006.01)
(52) U.S. Cl. ............... 455/414.2; 455/412.1; 455/518
(58) Field of Classification Search ........ 455/406, 455/519, 518, 456, 525, 414.2; 379/202.01, 379/211, 59; 370/461
See application file for complete search history.

(56) References Cited

U.S. PATENT DOCUMENTS

| | | | |
|---|---|---|---|
| 5,530,914 A | | 6/1996 | McPheters |
| 5,724,655 A | | 3/1998 | Grube et al. |
| 6,028,866 A | * | 2/2000 | Engel et al. ............... 370/461 |
| 6,292,672 B1 | * | 9/2001 | Chavez, Jr. ............... 455/519 |
| 6,757,531 B1 | * | 6/2004 | Haaramo et al. ......... 455/414.1 |
| 6,898,423 B2 | * | 5/2005 | Motegi et al. ............ 455/414.2 |
| 2001/0041556 A1 | * | 11/2001 | Laursen et al. ............ 455/406 |
| 2003/0021400 A1 | * | 1/2003 | Grandgent et al. ...... 379/202.01 |

FOREIGN PATENT DOCUMENTS

| | | |
|---|---|---|
| JP | 08 097823 A | 4/1996 |
| WO | WO 97/44762 A1 | 11/1997 |
| WO | WO 99/29129 A1 | 6/1999 |
| WO | WO 00/30374 A2 | 5/2000 |
| WO | WO/00/30375 A2 | 5/2000 |
| WO | WO 01/45310 A1 | 6/2001 |

OTHER PUBLICATIONS

Hall, Hans (WO 99/29129), Wireless Mobile Communication Devices for Group Use□□Jun. 10, 1999.*

* cited by examiner

*Primary Examiner*—Joseph Feild
*Assistant Examiner*—Phuoc Doan
(74) *Attorney, Agent, or Firm*—Randall S. Vaas; Sylvia Chen

(57) ABSTRACT

The invention relates to a group application for group formation and management, in particular in a wireless environment. The present invention provides a group application in which a membership list of a group is kept updated automatically by communications between the group applications of the group. The group application handles all the complexity involved in setting up a group and maintaining a membership list for the group, without user intervention. Advantageously, the group application is implemented as a software agent. The invention also relates to an electronic device having a group application or software agent of the invention loaded therein.

17 Claims, 5 Drawing Sheets

GROUP APPLICATION FOR GROUP FORMATION AND MANAGEMENT

The present invention relates to a group application for group formation and management. The invention is particularly suited to a group formation and management application for a wireless environment.

One exciting new application envisioned for the wireless internet is one-to-many or group communication. It is clear that Internet users want to share information with those who have a similar interest or affiliation or with an individually selected group, for example a group of friends or colleagues or a family group. It is envisaged that users will wish to communicate with others in a similar manner using wireless communication devices, to enable group communication at any time, wherever the user is. Therefore, group communications is expected to be an important application driving demand for wireless internet devices.

One method of enabling group communications is for each member of the group to maintain a private address list containing the addresses of all members of the group. This private address list is used to send a group message to all the members of the group.

In order to maintain the integrity of the member list, when a user joins the group, all existing members would have to add the address of the new user to their group address list. In addition, when a user wishes to leave the group, all existing members would have to remove the address of the leaving user from their group address list. This is clearly unfeasible for large groups. However, even with smaller groups it will be apparent that adding and removing users from the list is unreliable and labour-intensive. This acts as an impediment to the use of private address lists for group communications.

An alternative method to the use of individual private address lists for group communications is to maintain a central list of the address of each member of the group. This has the advantage that only one address list must be maintained. Mailing lists are an example of existing internet server-based groups, which allow users to communicate over the internet with a group of people using this principle. The mailing list is hosted by a server which maintains a list of current members of the list.

Before subscribing to the mailing list users must first know the mailing list name and the server hosting the mailing list. In order to subscribe to the mailing list "MailingList" hosted by server "MLserver" the user must send an appropriately coded email, for example "subscribe MailingList" to the right group "major-domo@MLserver. Thereafter the user may post messages to the list by sending an email addressed to "MailingList". These messages will be distributed by the server to all users currently subscribed to the mailing list. Equally, any messages posted to the list by other subscribers will be forwarded by the server to the user as a current member. In order to unsubscribe to the mailing list the user must send a different email, for example "unsubscribe MailingList" to "major-domo@MLserver".

Although mailing lists enable effective group communication over the internet, the user must know beforehand of the existence of the mailing list and the address of the server hosting the mailing list. In addition, the user must be educated in the syntax required to subscribe or unsubscribe to the mailing list. These issues add complexity and reduce use of these communication methods by less technologically literate users.

The present invention seeks to provide an easy and simple way to enable group communications and manage group interactions. The present invention is particularly applicable to group communications in a wireless environment, but is also suitable for other environments in which users wish to interact.

In accordance with the present invention there is provided a group application, for providing communication between a user of the group application and members of a group of users each having a group application, comprising membership list management means for interacting directly with other group applications without user intervention to maintain an accurate local membership list of all group members at each member group application.

In accordance with an advantageous embodiment of the invention, a group application is used to initiate an invitation to the group. Running the group application on the receiving user's terminal will signify acceptance of group membership. The application-enabled group would enable group members to talk to one another on a peer-to-peer level. One posting would be broadcast to all the members of the group.

Thus in accordance with the present invention, all the complexity involved in setting up a group or subscribing to/unsubscribing from a group is hidden from the user. Thus, a new group may be initiated, and selected members invited to join the group in a simple fashion. In addition, a user invited to join a group is provided with an easy way of accepting or rejecting the invitation.

The self-forming groups may be administered in a peer-to-peer fashion, with each member's communication device participating in a group call.

Advantageously software agents can be used to represent users and achieve the group interactions in a meeting place (ie a software environment for those agents) and then return filtered information to the end-users.

The Mobile Execution Environment (MExE), currently under standardisation by ETSI (European Telecommunications Standards Institute), and the JAVA portable programming environment preferably provide the groupware defined by the invention.

In accordance with another aspect of the invention, there is provided an electronic device having a group application in accordance with the invention, or a software agent in accordance with the invention, installed therein.

For a better understanding of the present invention, and to show how it may be brought into effect, reference will now be made, by way of example, to the accompanying drawings, in which.

An exemplary embodiment of the invention will now be described with reference to FIGS. 1–6. This embodiment of the invention relates to a group application adapted for use in a situation in which a user initiates a group. This embodiment of the invention is particularly suited to private groups, such as a group of friends, family or work colleagues.

Figure 1:
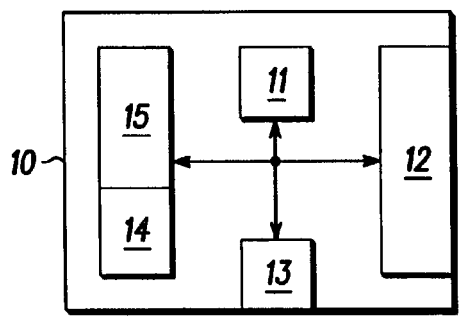
FIG. 1 shows a diagrammatic representation of a device having a group application in accordance with an embodiment of the present invention.

FIG. 1 is a diagrammatic representation of a device having a group application in accordance with an embodiment of the present invention.

The device 10 has a controller 11 for controlling the operation of the device; a communication section 12 for communicating with other devices; a user interface section 13 for communicating with a device user; and a memory 14 in which is stored at least a group application 15 in accordance with an embodiment of the invention. In addition, the device 10 may have a number of other parts, as will be apparent to a skilled person, which are not relevant to the operation of the present invention and so will not be described in further detail.

The controller 11 may be implemented as a microprocessor. The communication section 12 is preferably a wireless communication section which typically includes an antenna, a transmit section and a receive section. However, a wireline communication section or modem could also be used. The user interface section 13 typically includes a display and a button- or keyboard-type input.

The controller 11 is connected to the communication section 12, the user interface section 13 and the memory 14 to control the operation of the device when running the group application 15. In addition, the group application 15 can be received via the communication section 12, and a copy of the group application 15 may be sent, for example to another device, via the communication section 12. Alternatively the group application 15 may be stored in the memory 14 during manufacture of the device 10.

Figure 2:
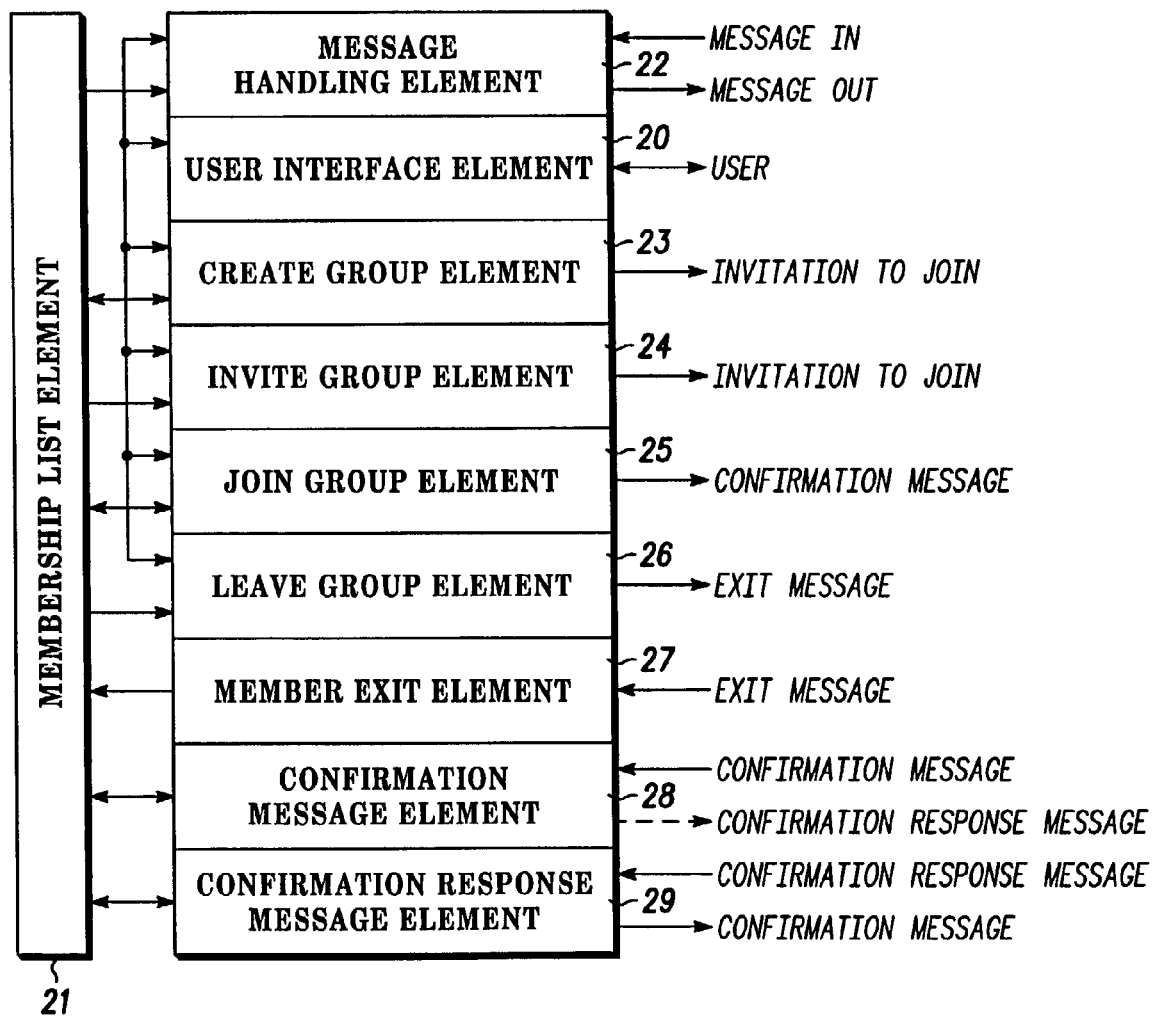
FIG. 2 shows a diagrammatic representation of the constituent elements of an exemplary group application in accordance with an embodiment of the present invention.

FIG. 2 is a diagrammatic representation of the constituent elements of an exemplary group application in accordance with an embodiment of the present invention.

The group application shown in FIG. 2 comprises a number of constituent elements, each performing a different function as will become clear with reference to the following description. Preferably, the group application will be implemented in a suitable software language program having corresponding software elements. However, it should be noted that not all of the elements shown are strictly necessary to the invention and in addition it would be possible for a skilled person in the art to implement some of the functional elements shown separately in FIG. 2 in the same software element. Preferably the group application is implemented using an object-oriented programming language, such as the JAVA programming language.

The group application shown in FIG. 2 comprises a plurality of elements: firstly a user interface element 20, for enabling interaction with a user; a membership list element 21, for holding a list of the members of the group; group membership elements 22–26, for enabling user interaction with the group members; and membership list management elements 27–29, for ensuring that the membership list held by the membership list element is maintained or updated correctly. The different functions performed by the different elements will now be explained in more detail.

The user interface element 20 provides an interface between the user and the group membership elements 22–26 to allow the user high level control over group membership and interaction with other users via their corresponding group applications. Advantageously, the user interface element provides the user with a menu to enable selection of the feature provided by each of the group membership elements 22–26. Alternatively, user interface element may provide buttons or support voice activation to enable selection of the feature provided by each of the group membership elements 22–26.

The membership list element 21 holds a local list of the current members of the group. The list contains at a minimum contact information for each of the members, such as a telephone number or an Internet Protocol (IP) address. In addition, the list can contain other information such as alternative contact numbers and the person's name or nickname. This list can be updated by at least some of the other elements. In addition, at least some of the other elements use the current membership list in carrying out their respective functions.

The first group membership element is the message handling element 22, which handles the transfer of messages between the members of the group. Incoming messages from other group members are received through the communication section 12 and are presented to the user via the user interface element 20 and the user interface section 13, for example on a display. To send a message to the group the user selects the send message function presented by the user interface element to access the message handling element. The message handling element 22 obtains the message to be sent from the user via the user interface element and the user interface section 13. The message handling element 22 obtains the current membership list from the membership list element 21 and sends the message to all current members of the group.

The second group membership element is the create group element 23, which enables the user to initiate the formation of a new group. The create group element 23 is selectable by an originating user via the user interface element 20 and the user interface section 13. The contact details for the originating user, for example the telephone number of a wireless telephone device 10, are either pre-stored as the originating membership information in membership list element 21 or is added by the create group element 23 from information received via the user interface element 20 and the user interface section 13. The create group element 23 sends an invitation to join message, comprising a copy of the group seed application containing the originating membership information, to all potential new members of the group identified by the originating user.

The third group membership element is the invite group element 24, which enables the user to invite new users to join an existing group. The invite group element 24 is very similar in operation to the create group element 23 described above, except that the membership list element 21 contains membership information for all current members of the group.

The fourth group membership element is the join group element 25, which enables a user to accept or reject an invitation to join a group. When a group application is received in the potential member's device, the join group element 25 is activated and presents, via the user interface element 20 and the user interface section 13 of the potential member's device, a choice as to whether or not to join the group. If the potential member accepts membership of the group, the join group element adds their membership information (i.e at least contact information such as the IP address or telephone number of the device 10, for example) to the membership list in the membership list element 21 and sends a confirmation message containing the updated membership list information held by the membership list element back to the originator.

The fifth group membership element is the leave group element 26, which enables a user to leave a group. When selected by the user via the user interface element 20 and the user interface section 13, the leave group element 26 obtains the current membership list from the membership list element and sends an exit message to all current members of the group.

The first membership list management element is the member exit element 27, which updates the membership list held by the membership list element 21 when notified that a member has left the group. On receipt of an exit message via the communication section 12, the member exit element 27 deletes membership information relating to the exiting member from the membership list held by the membership list element 21. Additionally (but not shown) the withdrawal of the exiting member may be notified to the user via the user interface element 20 and the user interface section 13.

The second membership list management element is the confirmation message element 28, which updates the membership list held by the membership list element 21 by adding membership information of the user from which the confirmation message was received. In addition the confirmation message element 28 also compares the updated membership list held by the membership list element 21 with the membership information received with the confirmation message. If the lists are identical, no further action is necessary. If the lists are not identical, the confirmation element 28 sends a confirmation response message, identifying the additional members, back to the user from which the confirmation message was received. This may be achieved, for example, by including the whole updated membership list with the confirmation response message as shown. Alternatively, the confirmation response message may contain information relating only to the additional members.

The third membership list management element is the confirmation message response element 29, which updates the membership list held by the membership list element 21 to include further members contained in the membership list received in the confirmation response message. The confirmation message response element 29 then sends a confirmation message containing the updated membership list to those further members.

Figure 3:
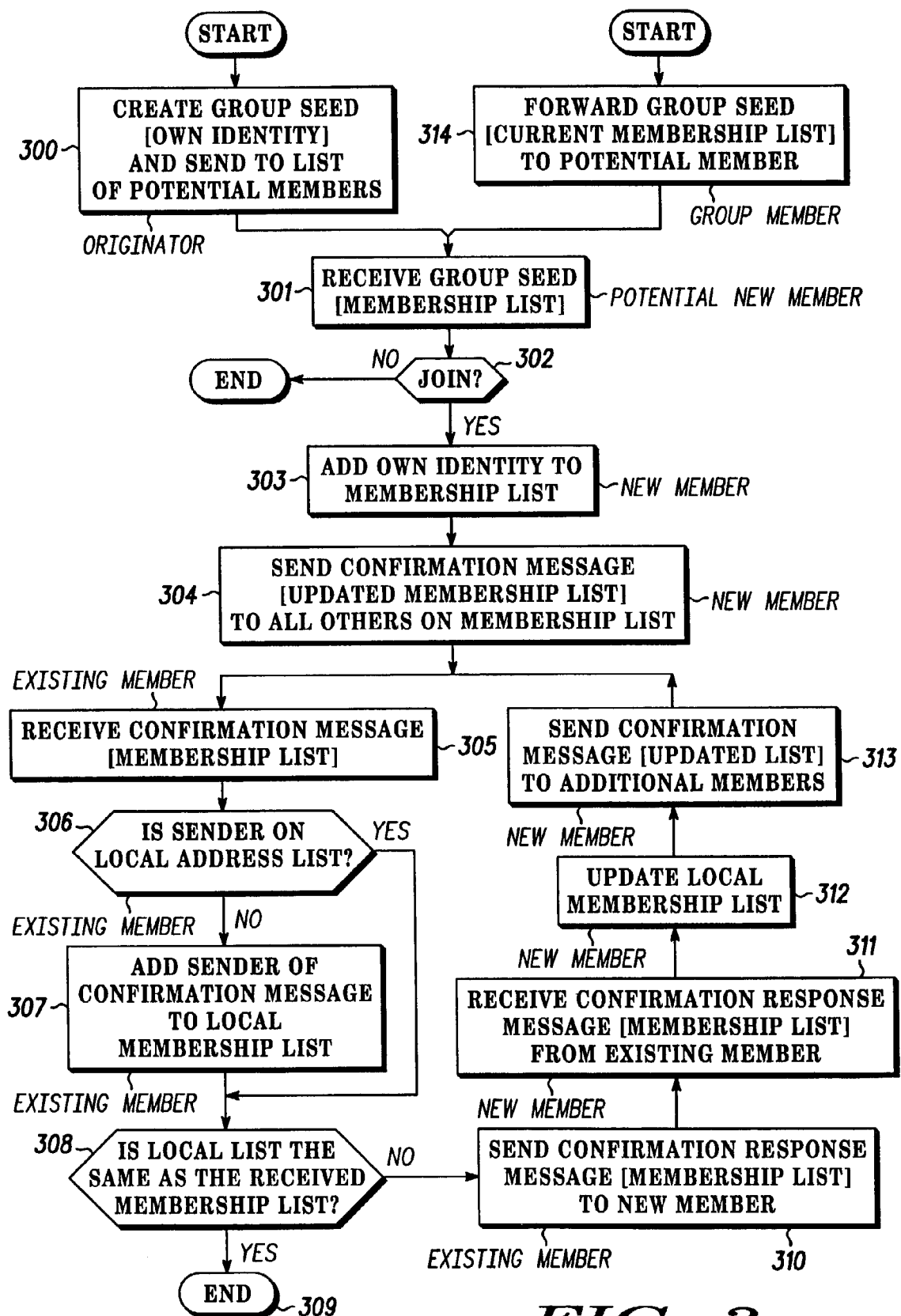
FIG. 3 is a flow chart illustrating the operation of a group application in accordance with an embodiment of the invention.
Figure 4:
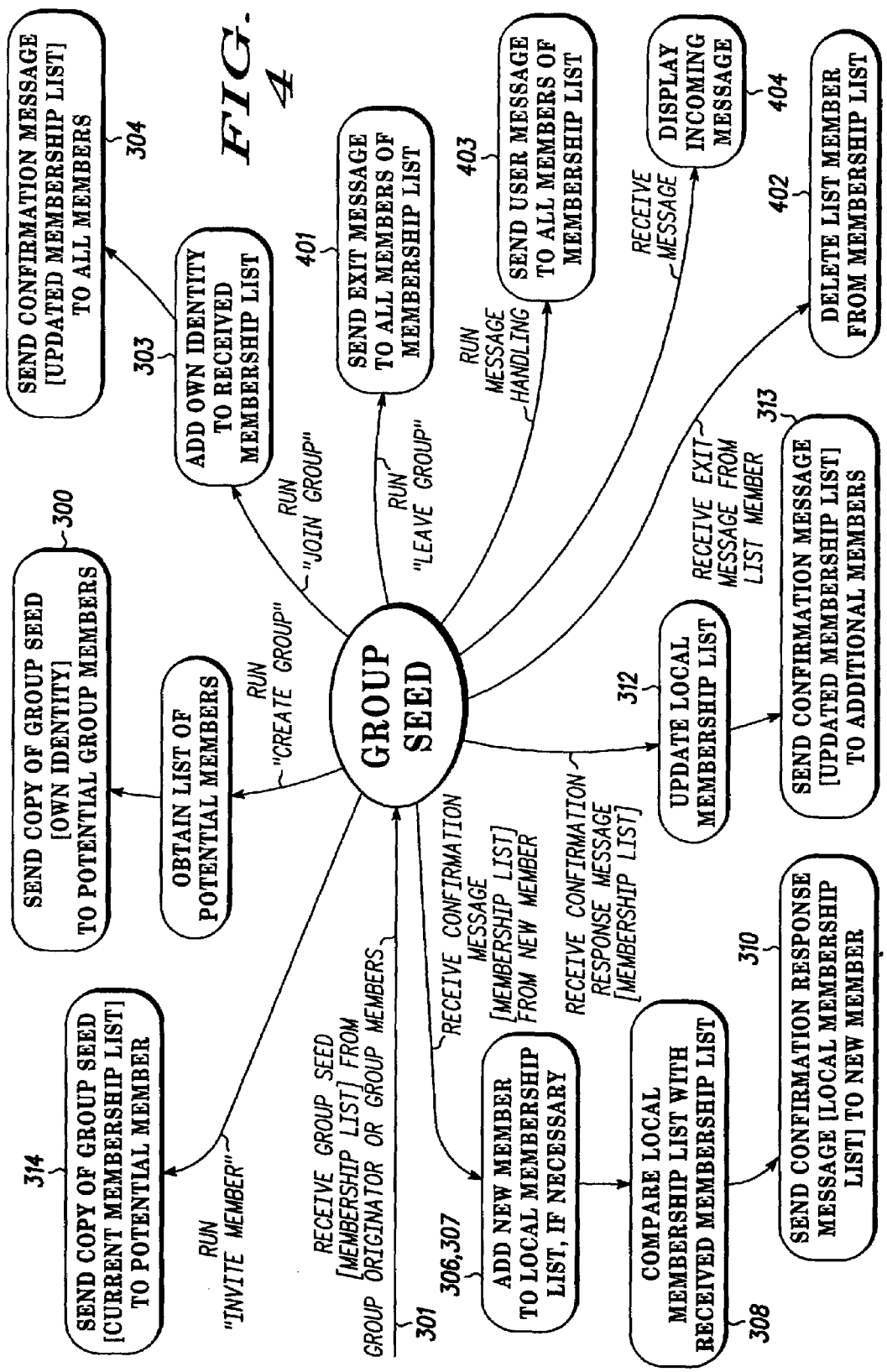
FIG. 4 is an illustration of the action of a group application in accordance with the described embodiment of the invention in response to inputs from the user or messages received.

FIG. 3 is a flow chart illustrating the operation of an exemplary group application in accordance with an embodiment of the invention.

Firstly, a group application is created by the originator 300. The group application has one confirmed group member, the originator. The originator sends the group seed to potential new members i.e. people the originator would like to join the group.

A potential new member receives the group application containing the current member list and the respective addresses 301. At this stage the current membership list contains membership information of the originator only. If the potential new member wishes to belong to the group, the group application is run by the potential new member 302. The group application adds the new member's identity and address to the member list 303 and sends a confirmation message containing the updated member list to all other users in the member list 304. In this case, the membership list contains only the originator and the new member, and the confirmation message is sent back to the originator. Existing group members may be listening on a predetermined port number, for example, and the application may start a daemon listening to the same port number.

When an existing member receives a confirmation message 305, the identity of the sender of the confirmation message is added to the record of the member list held by the existing member (the local list), if necessary 306, 307. In addition, the local list is compared with the member list received with the confirmation message (the received list) 308.

If the local list and the received list are identical, no action is necessary 309. If, however, the local list and the received list are not identical, additional members have joined the group. In this situation, the existing member sends a confirmation response message to the new group member identifying all the additional members in the local list 310. This may be achieved by including the entire local list with the confirmation response message, as shown, or by including membership information of the additional members only, for example.

On receipt of the confirmation response message 311, the new member updates their local list of group members 312 to include the additional members identified in the confirmation response message. In addition, the new member sends a confirmation message to the additional members to enable the respective local lists of the additional members to be updated 313.

Furthermore, an existing group may be added to by forwarding the group seed application to a further potential new member 314. The potential new member may accept or reject membership of the group as outlined above 301, 302.

An illustration of the action of a group application in accordance with the described embodiment of the invention in response to inputs from the user or messages received, as described above, is shown in FIG. 4. Steps which are identical to those shown in FIG. 3 have been given the same reference numerals.

In addition, as described above with reference to FIG. 2, if an existing group member decides to leave the group, the group application may be run and an option to leave the group selected. The group application sends an exit message to all members in its local list 401. On receipt of the exit message, a receiving group application deletes the relevant identity and address from the local list maintained by the receiving group application as outlined above 402.

Furthermore, the group application "message handling" option provided by the message handling element described above with reference to FIG. 2, can be used to send a message to the other members of the group 403. In addition, as described with reference to FIG. 2 the group application notifies the user of messages received from other group members, for example by displaying them on the device display 404.

Figure 5:
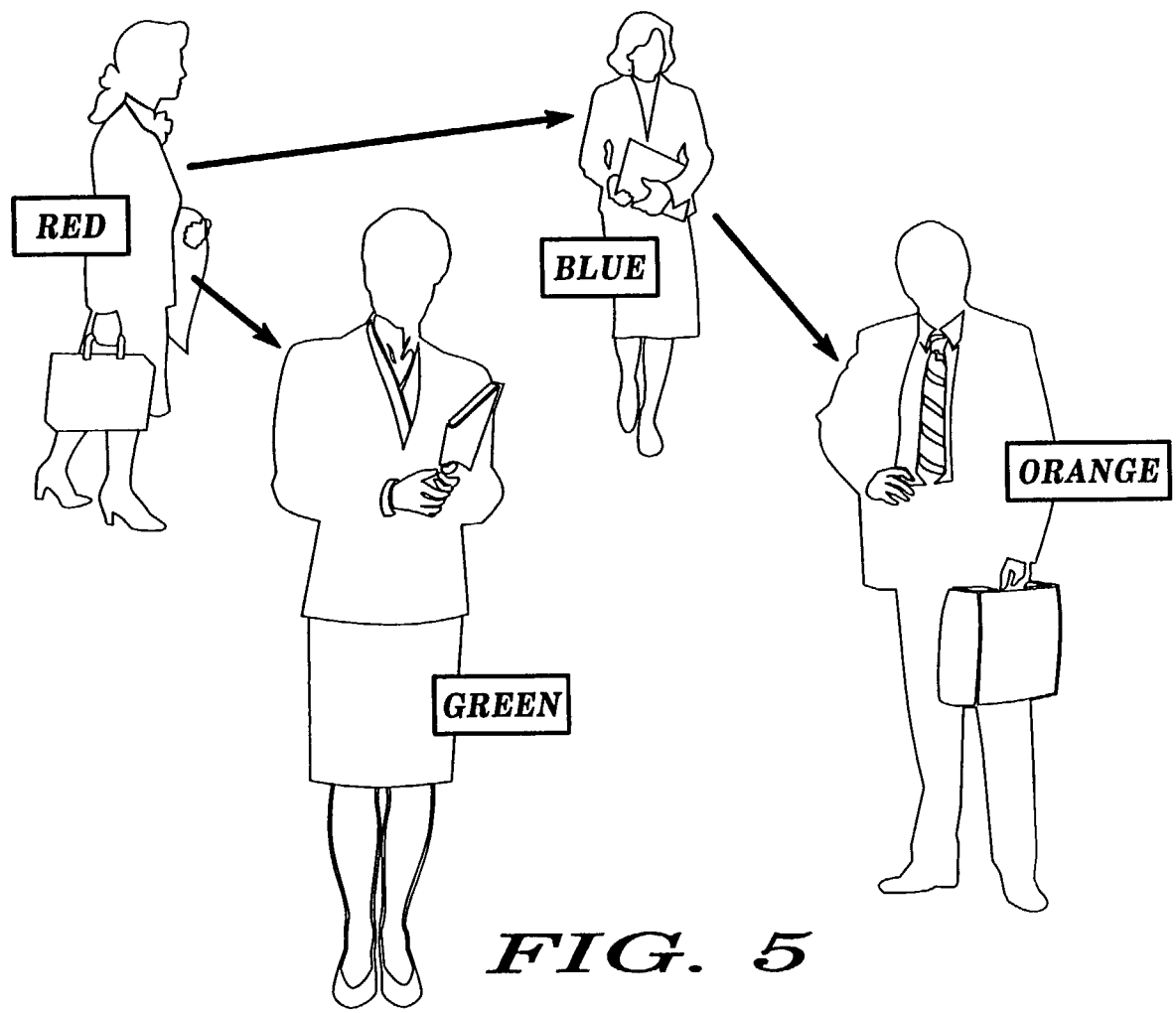
FIG. 5 illustrates the formation of a group of four users.
Figure 6:
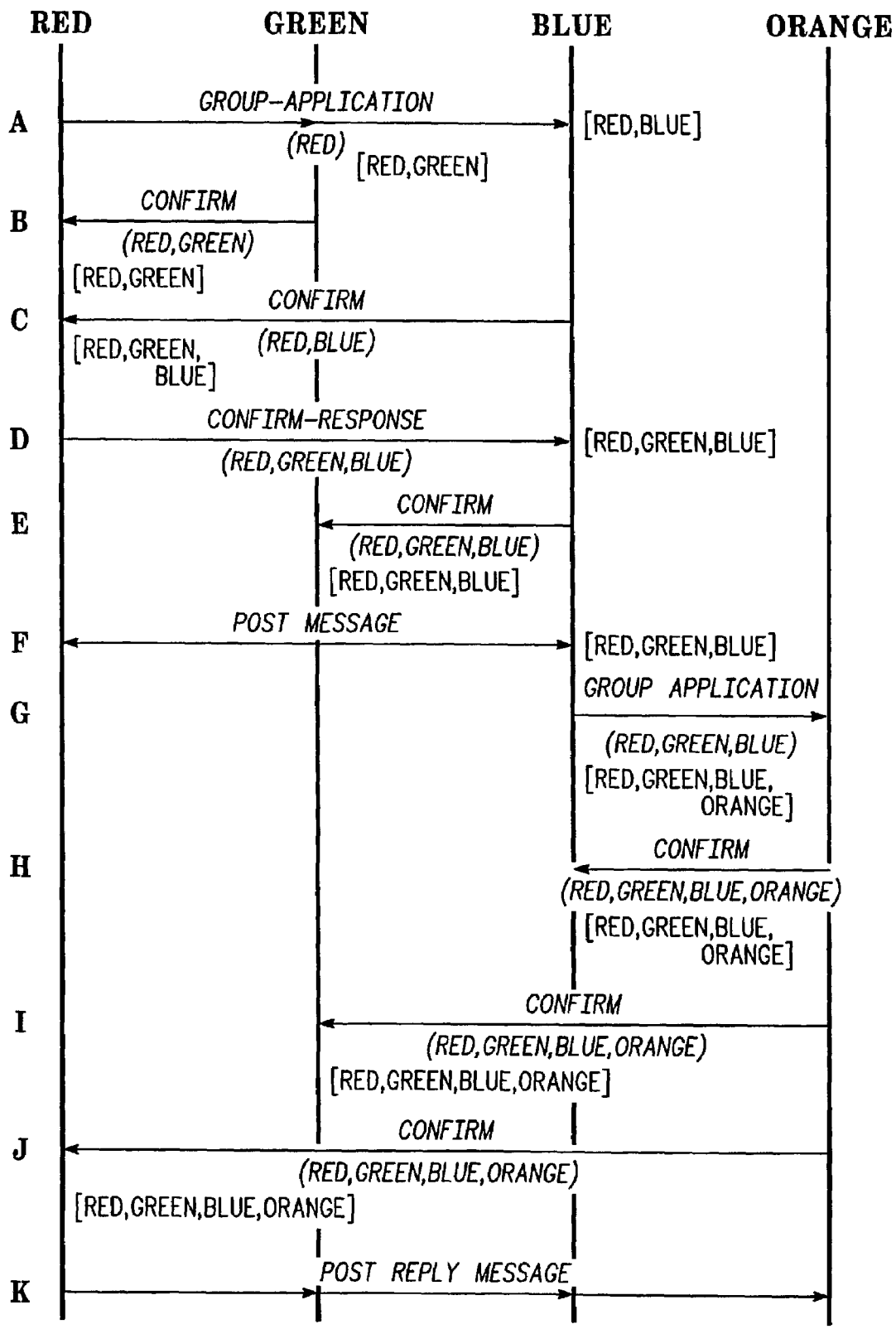
FIG. 6 shows an exemplary messaging sequence during group formation in accordance with this embodiment of the invention.

The formation, in accordance with an embodiment of the invention, of a group comprising users Red, Green, Blue and Orange, as shown in FIG. 5, will be described with the aid of the exemplary messaging sequence described with reference to FIG. 6.

The illustrated messaging sequence relates to the initiation by user Red of a group with users Green and Blue. In the following the terminology "Colour" is used to refer to the device and group application of the user "user Colour".

Initially, as indicated above, user Red prepares a group application and sends it to users Green and Blue (A). The group application includes a membership list containing only the group originator, Red.

User Green receives the group application and accepts membership of the group by running the group application. A confirmation message is sent to Red, the confirmation message containing a member list of Red and Green (B). On receiving the confirmation message from Green, Red adds Green to its local list of members. As Red's local list (Red, Green) is identical to the member list received from Green (Red, Green), no further action is necessary.

User Blue receives the group application and also accepts membership of the group by running the group seed application. A confirmation message is sent to Red containing a member list of Red and Blue (C). On receiving the confirmation message from Blue, Red adds Blue to its local list of members. Red compares its local list (Red, Green, Blue) with the member list received from Blue (Red, Blue) and identifies that Green is not present in the member list received from Blue. Red sends to Blue a confirmation response message containing the member list of Red, Green and Blue (D), thus identifying Green as an additional member of the group. Blue adds Green to its local member list and sends a confirmation message, containing the member list Red, Blue and Green to Green (E). On receipt of the confirmation message Green updates its local list to include Blue. The group formation is now complete, as each user has a complete membership list containing all members of the group.

When a user wishes to send a message to the group, the group seed broadcasts the message to the other members of the group on the local list. Thus, a message posted by user Green is sent by Green to Red and Blue (F).

User Blue wishes to expand the group and so sends the group seed application, containing the current list of members (Red, Green, Blue) to user Orange (G).

User Orange receives the group seed application and again accepts membership of the group by running the group seed application. A confirmation message, containing a member list of Red Green Blue and Orange is sent to all members of the group (H, I, J). On receiving the confirmation message, each of Red Green and Blue adds Orange to its local list of members and compares its local list to the member list received from Orange. As the local lists of Red Green and Blue are now identical to the member list received from Orange, no further action is necessary.

Once more, when a user wishes to send a message to the group, the group seed broadcasts the message to the other members of the group on the local list. Thus, a message posted by user Green is sent by Green to Red Blue and Orange (K).

The group seed application in accordance with an advantageous embodiment of the invention is implemented as a software agent.

The group seed application software agent represents the user in the "network world". For example, the agent will learn (or be given) the user preferences and profile as well as common tasks to do. The agent is autonomous (it can take decisions on its own, without always asking the user) and is pro-active (it can initiate a task without being asked if it "feels" this task has to be done).

The group seed application software agent communicates with other group seeds in order to achieve the tasks set by the user. An ACL (agent communication language) may be used by the software agents to facilitate discussions between the different group seed application software agents.

Thus instead of interacting directly with the user, the group mechanisms will be handled by the agents representing the users. This provides a greater degree of flexibility as a user may only ask for a high-level goal like: "organize a trip to the cinema" and his personal agent will try to invite his friends (as found in his telehone list) according to their availability. The agent will then create the group according to the parameters for the event set by the user.

Thus the present invention provides an advantageous group application which maintains an accurate membership list of a group without user intervention. The group application advantageously is implemented as a software agent. As will be apparent to a skilled person, changes and modifications may be made to the described arrangements without departing from the scope of the invention.

The invention claimed is:

1. An electronic device comprising:
    a communication section for communicating with another device;
    a controller for controlling operation of the electronic device; and
    a group application, coupled to the controller and the communication section, for providing communication between a user of the group application and members of a group of users each having a group application, comprising membership list management means for interacting directly with other group applications without user intervention to maintain an accurate local membership list of all group members at each member group application by sending a message to all the members listed in the local membership list, the message comprising information for at least one of (a) deleting a member from a membership list and (b) adding a member to a membership list.

2. The electronic device as claimed in claim 1 wherein the group application further comprises group membership means for interacting with other group applications responsive to user selection.

3. The electronic device as claimed in claim 2 wherein the group membership means comprises a leave group element for sending an exit message to all group applications of the user group.

4. The electronic device as claimed in claim 2 wherein the group membership means comprises a join group element for sending a confirmation message in response to a user indication of a desire to join the group.

5. The electronic device as claimed in claim 4 wherein the confirmation message is sent to all others on the membership list.

6. The electronic device as claimed in claim 4 or 5 wherein the confirmation message contains membership list information including information relating to the sending group application.

7. The electronic device as claimed in claim 2 wherein the group membership means comprises means for sending a new group application containing a membership list to a potential new member.

8. The electronic device as claimed in claim 7 wherein the membership list of the new group application contains membership list information relating to the sending group application.

9. The electronic device as claimed in claim 7 wherein the membership list of the new group application contains membership list information relating to the complete current group membership.

10. The electronic device as claimed in claim 1 wherein the membership list management means comprises a member exit element for updating the group seed application membership list to delete a member on receipt of an exit message from that member.

11. The electronic device as claimed in claim 1 wherein the membership list management means comprises a confirmation message element for receiving a confirmation message containing a membership list information from a second group application, wherein the confirmation message element compares the received membership list information with the group application membership list and sends a confirmation response message containing information relating to additional members to the second group application in the event of differences.

12. The electronic device as claimed in claim 11, further including the step of adding the sender of the confirmation message to the membership list held by the group seed application.

13. The electronic device as claimed in claim 11, wherein the information relating to additional members is a copy of the group seed application membership list.

14. The electronic device as claimed in claim 1 wherein the membership list management means comprises a confirmation response message element for updating the group application membership list to include additional members in response to membership information received in a confirmation response message and for sending a confirmation message containing additional membership list information to the additional members.

15. The electronic device as claimed in claim 1, wherein messages sent between group applications during set up of the membership list management means contain membership address list information.

16. The electronic device as claimed in claim 1 wherein the group application comprises a software agent.

17. The electronic device as claimed in claim 2 wherein user selection is provided by a software agent.

* * * * *